(12) United States Patent
Chasteau et al.

(10) Patent No.: US 12,280,892 B2
(45) Date of Patent: Apr. 22, 2025

(54) CRADLE FOR AN AIRCRAFT LANDING GEAR ASSEMBLY

(71) Applicant: AIRBUS OPERATIONS LIMITED, Bristol (GB)

(72) Inventors: Dominique Chasteau, Bristol (GB); Guilherme Barsali, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/324,796

(22) Filed: May 26, 2023

(65) Prior Publication Data

US 2023/0382562 A1 Nov. 30, 2023

(30) Foreign Application Priority Data

May 27, 2022 (GB) ...................................... 2207822

(51) Int. Cl.
*B64F 5/50* (2017.01)
*B66F 9/12* (2006.01)
*B66F 9/18* (2006.01)

(52) U.S. Cl.
CPC ................ *B64F 5/50* (2017.01); *B66F 9/125* (2013.01); *B66F 9/18* (2013.01)

(58) Field of Classification Search
CPC .... B64F 5/50; B64F 5/10; B66F 9/125; B66F 9/18; B66F 7/22; B66F 7/28; B66F 7/0625; B64C 25/00
See application file for complete search history.

(56) References Cited

U.S. PATENT DOCUMENTS

| | | | |
|---|---|---|---|
| 2,484,900 A | 10/1949 | McPherson et al. | |
| 4,445,657 A * | 5/1984 | Breckenridge | A01M 7/0053 248/74.1 |
| 7,967,245 B2 | 6/2011 | Seror-Goguet et al. | |
| 9,643,738 B2 * | 5/2017 | DesJardien | B64F 5/50 |
| 10,112,699 B2 | 10/2018 | Simonneaux et al. | |
| 2007/0110552 A1* | 5/2007 | Groves | B66F 7/22 414/589 |

(Continued)

FOREIGN PATENT DOCUMENTS

| | | |
|---|---|---|
| CN | 102 745 340 A | 10/2012 |
| CN | 109 080 850 A | 12/2018 |

(Continued)

OTHER PUBLICATIONS

Extended European Search Report for Application No. EP 23175512.5, 81 pages, dated Oct. 5, 2023.

(Continued)

*Primary Examiner* — Lee A Holly
(74) *Attorney, Agent, or Firm* — Nixon & Vanderhye P.C.

(57) ABSTRACT

A cradle for supporting an aircraft landing gear assembly is disclosed including a chassis for transporting the cradle and an arm movable between a stowed position and an elevated position with respect to the chassis. The arm has a set of clamps for securing the landing gear assembly to the cradle. In this way the landing gear assembly is held securely in the stowed position for storage and transport, and held securely in the elevated position for installation to an aircraft, such that damage to the landing gear assembly during transportation and installation is minimised.

19 Claims, 6 Drawing Sheets

(56) References Cited

U.S. PATENT DOCUMENTS

| | | | |
|---|---|---|---|
| 2010/0119343 A1* | 5/2010 | Groves | B66F 7/14 |
| | | | 414/590 |
| 2011/0138574 A1 | 6/2011 | Bogue et al. | |
| 2013/0099052 A1 | 4/2013 | Gleyze | |
| 2015/0251750 A1 | 9/2015 | Cook et al. | |
| 2015/0314861 A1 | 11/2015 | Paddock et al. | |
| 2017/0050830 A1* | 2/2017 | Podnar | B66F 9/07568 |
| 2017/0106972 A1* | 4/2017 | Sobajima | B66C 23/48 |
| 2018/0029697 A1 | 2/2018 | Ditzler | |
| 2019/0218840 A1 | 7/2019 | Hacault | |
| 2019/0300142 A1 | 10/2019 | Helsley | |
| 2021/0394556 A1 | 12/2021 | Winters | |

FOREIGN PATENT DOCUMENTS

| | | |
|---|---|---|
| CN | 109 720 555 A | 5/2019 |
| CN | 209 938 997 U | 1/2020 |
| CN | 210 391 588 U | 4/2020 |
| CN | 212 172 576 U | 12/2020 |
| CN | 112 960 111 A | 6/2021 |
| CN | 113428809 | 9/2021 |
| CN | 215707227 | 2/2022 |
| CN | 215798268 | 2/2022 |
| EP | 0597688 | 5/1994 |
| EP | 3 476 714 A1 | 5/2019 |
| EP | 3 814 232 B1 | 4/2022 |
| GB | 624 831 A | 6/1949 |
| JP | 2007-154983 A | 6/2007 |
| JP | 2017-077741 A | 4/2017 |
| KR | 10-2016-0107811 A | 9/2016 |
| KR | 10-1749982 B1 | 6/2017 |
| WO | 2005/096721 A2 | 10/2005 |
| WO | 2016/077122 A1 | 5/2016 |
| WO | 2020/001844 A1 | 1/2020 |

OTHER PUBLICATIONS

Combined Search and Examination Report for GB2207822.4 dated Nov. 23, 2022, 7 pages.
Example of MLG Gradle, URL: https://rotafilo.com.tr/about/, 1 page.
Example of Frame Trolley Kit, "B737-600 to-900 MLG Changing Frame Kit for MLGTMULTI-1 (hydro.aero)", https://www.hydro.aero/de/produkt-details/b737-600-to-900-mlg-changing-frame-kit-for-mlgtmulti-1.html, 5 pages.
Example of Landing gear trolley, 1 page.
"Airbus MLG Trolley—MLGT52-001 | Aircraft Tool Hire Ltd (archive.org)", https://web.archive.org/web/20211018100807/https:/aircrafttoolhire.com/tools/30/airbus-mlg-trolley, Oct. 18, 2021, 1 page.
"MLGTMULTI-1-AC: Hydro MLG R/I Trolley | Boeing Shop", https://shop.boeing.com/aviation-supply/p/MLGTMULTI1AC=8K, 2 pages.
Extended European Search Report for Application No. 23178132.9, seven pages, dated Nov. 2, 2023.
Combined Search and Examination Report for Application No. GB2208513.8, five pages, dated Dec. 13, 2022.
Search Report for Application No. GB2304836.6, one page, dated Sep. 11, 2023.
Search Report for Application No. GB2304839.0, one page, dated Sep. 13, 2023.
Search Report for Application No. GB2304839.0, one page, dated Feb. 14, 2024.
Search Report for Application No. GB2304831.7, one page, dated Sep. 22, 2023.
Search Report for Application No. GB2304830.9, one page, dated Sep. 15, 2023.
Search Report for Application No. GB2304828.3, one page, dated Sep. 14, 2023.
Search Report for Application No. GB2304828.3, one page, dated Feb. 15, 2024.

* cited by examiner

CRADLE FOR AN AIRCRAFT LANDING GEAR ASSEMBLY

CROSS RELATED APPLICATION

This application claims priority to United Kingdom Patent Application GB 2207822.4 filed May 27, 2022, the entire contents of which is hereby incorporated by reference.

BACKGROUND OF THE INVENTION

The present invention relates to cradles for supporting landing gear assemblies for aircraft. More particularly, but not exclusively, this invention concerns the handling of landing gear assemblies prior to being fitted to an aircraft.

A landing gear assembly may be supplied by a component manufacturer in a semi-assembled state with a main strut, actuator, parts of the sidestay and other loose elements packaged as a kit. The packaged landing gear assembly is typically transported by road or other means from the component manufacturer to a Final Assembly Line (FAL) or maintenance facility for fitting to an aircraft. On arrival the packaging materials (typically wooden or metal stillages and crates, ratchet straps and other packaging elements) are removed and may be discarded. The landing gear assembly is then placed on a trolley or stand.

Published European Patent Application EP0597688A1 ("EP '688") shows an example of a landing gear trolley.

Referring to FIG. 1 of the present application, a landing gear stand 100 is shown, which is arranged to support a landing gear assembly 130 before being fitted to an aircraft at the FAL or maintenance facility. The stand 100 includes wheels 120 which allow the stand 100 to be moved underneath the aircraft (not shown), and an arm 110 which holds the landing gear assembly 130 in an upright position. The landing gear assembly 130 is then hoisted towards the aircraft with straps (not shown) and manoeuvred into position, being guided by hand. The main attachment points of the landing gear assembly 130 must be carefully lined up with the attachment points of the aircraft, and finally these are connected to attach the landing gear assembly 130 to the aircraft.

In the case of both the trolley of EP'688 and the stand 100 of FIG. 1, the aircraft to which the landing gear is to be fitted must be jacked up with enough ground clearance for the landing gear assembly and its support to be moved into position. Space is often restricted in the vicinity of the landing gear bay/wheel-well where the main landing gear assembly is attached to the aircraft. For these reasons the final manoeuvring of the landing gear assembly into position for attachment may be difficult and slow, requiring several maintenance personnel who may have to work at height in a confined space which may be further compromised by the presence of the trolley, stand and/or straps.

There may also need to be several steps of manoeuvring, manipulating, packaging and/or unpackaging the landing gear before it is finally fitted to the aircraft at the FAL.

With all of the foregoing there is a risk of damage occurring to the landing gear assembly and/or the aircraft during transportation and installation. Careful handling of heavy high-value items often requires extra skill and/or time.

The present invention seeks to mitigate one or more of the above-mentioned problems. Alternatively or additionally, the present invention seeks to provide an improved cradle for a landing gear assembly of an aircraft, and improved methods of transporting and installing landing gear assemblies.

SUMMARY OF THE INVENTION

The present invention provides, according to a first embodiment, a cradle for supporting a landing gear assembly to be installed on an aircraft. The cradle comprises a chassis arranged to facilitate transportation of the cradle, and an arm coupled to the chassis. In embodiments, the chassis may thus enable transportation of the cradle from a first facility, which may be a production facility at which the landing gear assembly is manufactured, to a second different facility, which may for example accommodate the part of the final assembly line at which the landing gear assembly is attached to the aircraft. In embodiments, the cradle is arranged (for example, by being shaped in a particular way and/or by the provision of suitable structure) to provide protection for the landing gear assembly when transported by the cradle. It may be considered, for example, that the cradle has a shape and/or structure which cradles the landing gear assembly when being transported by it. For example, the cradle may have a shape and/or structure which has the effect of physically preventing an object, which is moving relative to the cradle in a horizontal direction and which is capable of otherwise damaging the cradled landing gear, from coming into contact with the cradled landing gear without first damaging the cradle. This reduces the likelihood of damage to cradled landing gear in the event that the cradle accidentally comes into contact with an aircraft jack, wing, or some fixed structure within the facility while the landing gear is being transported. The protective cradling function of the cradle may be provided as a result of the cradle having specially shaped sides for example and/or as a result of the cradle having extra structure in the form of a barrier for example.

The cradle is designed to be reusable (i.e. not disposable or intended for single-use operation only), and may for example be capable of being reused substantially in its entirety for more than ten separate landing gear assembly installations.

The arm is movable between a stowed position and an elevated position, and is arranged to hold the landing gear assembly.

Once held in position relative to the arm, the landing gear assembly and arm are moveable together between the arm's stowed position and elevated position. The arm may be provided with one or more interconnection devices to hold the landing gear assembly securely in position. In embodiments, the arm includes at least one clamping device for securing the landing gear assembly to the arm. In such embodiments, the cradle is configured and arranged to enable the arm to hold by means of at least one clamping device, the landing gear assembly in a stowed position for transportation (the stowed position of the landing gear assembly corresponding to the stowed position of the arm).

In such embodiments, the cradle is also configured and arranged to enable the arm to hold, by means of the at least one clamping device (possibly the same at least one clamping device), the landing gear assembly in an elevated position for its installation on the aircraft (the elevated position of the landing gear assembly corresponding to the elevated position of the arm). Thus, in use of such embodiments, the landing gear assembly is secured by the clamping device in such a way that the landing gear assembly is held by the arm in the stowed position for transportation of the cradle, and is held by the arm in the elevated position for installing the landing gear assembly on the aircraft.

There are several advantages to embodiments of the above invention. Providing a cradle which protects the landing gear assembly through the entire journey from the production facility where it is fabricated through to its attachment to the aircraft (via an improved method of positioning the landing gear assembly for attachment) significantly reduces the likelihood of damage to the landing gear assembly, since fewer discrete handling steps are involved. This also leads to efficiency and quality improvements as less time is spent removing packing and stillages, mounting the landing gear assembly on a stand, and arranging straps or other means to hoist the landing gear assembly towards the aircraft. Furthermore the reusable cradle reduces transport waste and improves efficiency; once a new landing gear assembly has been transported and mounted on the aircraft, the cradle may be returned to the component manufacturer's facility for use with another landing gear assembly requiring transportation and fitting. Such a process may be repeated multiple times.

Preferably the arm is coupled to the chassis via a hinged joint such that the arm is arranged to rotate about the hinged joint between the stowed position and the elevated position. The arm may comprise a main body which, in use, is aligned with the length of a main leg and/or strut of the landing gear. In use, when the landing gear assembly is secured in the stowed position for transportation by the cradle, the main body of the arm may be positioned directly beneath the main leg and/or strut of the landing gear. In other embodiments, the main body of the arm may be positioned to one side of the main leg and/or strut of the landing gear when stowed. In other embodiments, the arm may comprise at least two principal load-bearing struts, one or more struts of the arm being positioned to one side of the main leg and/or strut of the landing gear when stowed and one or more struts of the arm being positioned on the opposite side. The arm may form part of a frame (e.g. comprising a framework of load bearing struts).

The included angle between the stowed position and the elevated position may be at least 20 degrees, and is preferably between 30 and 60 degrees. This allows the landing gear assembly to be held in the elevated position and mounted on to the aircraft in a semi-retracted configuration.

In embodiments, it may be that the cradle secures the landing gear assembly on its side with one wheel facing up and the other down. In such a case, with the use of the cradle, the landing gear assembly may then be caused to pivot to the elevated position which may be less than vertical, such that reduced clearance is required between the aircraft and the ground.

Preferably the cradle further includes a lifting device for lifting the landing gear assembly relative to ground level. The lifting device may be configured for lifting the arm (and the landing gear assembly held by the arm) towards the aircraft, and optionally also the chassis or part of it. The arm preferably further comprises a frame, which has a longitudinal axis, the frame being arranged to rotate about its longitudinal axis. In this way, the cradle provides movement of the arm in several degrees of freedom which facilitates accurate and efficient positioning of the landing gear assembly in the correct orientation for fitting to the aircraft. The longitudinal axis of the frame may be parallel to a longitudinal axis of the arm. The longitudinal axis of the frame may be parallel to a longitudinal axis of the leg and/or main strut of the landing gear assembly. The longitudinal axis is preferably transverse (e.g. perpendicular) to an axis about which the arm is arranged to rotate when moving between the stowed position and the elevated position. It may be that the cradle is configured to enable movement of the landing gear with five and preferably six degrees of freedom. Movement of the chassis relative to the ground may provide up to three degrees of freedom—e.g. translational movement parallel to the ground and rotation about an axis perpendicular to the ground. The lifting device and the arm may provide up to three further degrees of freedom, as described above.

The chassis of the cradle may be integrated with wheels, or the like, to facilitate transportation of the cradle.

The clamping device preferably includes a set of arcuate jaw clamps arranged for securing a main strut of the landing gear assembly to the arm. Preferably the cradle further comprises at least one further fixing for attaching the landing gear assembly to the cradle when the arm in the stowed position and the landing gear assembly is stowed.

The cradle preferably further comprises at least one barrier arranged to protect the landing gear assembly when the arm in the stowed position and the landing gear assembly is stowed. In this way the landing gear assembly is well protected both during transportation between facilities, and when being stored or manoeuvred into position at the FAL or maintenance facility. In use, such a barrier may remain in situ as a part of the cradle, when installing the landing gear assembly on the aircraft. In other embodiments, the barrier may be configured to be moved (optionally removed from the cradle) when installing the landing gear assembly on the aircraft, and then subsequently moved back (or reattached to the cradle if previously removed). The barrier is reusable and forms a permanent part of the cradle (whether or not configured to be removable therefrom). It may be that the primary function (possibly the only function) of the barrier is to protect the landing gear assembly from damage.

According to a second aspect of the invention, a method of installing a landing gear assembly on an aircraft includes receiving, at a position under the aircraft, the landing gear assembly attached to a cradle. The landing gear is stowed within the cradle suitable for transportation of the landing gear—the cradle, for example, being configured to transport the landing gear between facilities with the cradle providing protection for the landing gear assembly during such transportation. After being received, the landing gear assembly is then elevated (i.e. while still held by, or otherwise attached to, a component of the cradle, for example a moveable arm) towards the aircraft. Once elevated the landing gear assembly is attached to the aircraft. The landing gear assembly may then be detached from the cradle.

The step of elevating the landing assembly towards the aircraft preferably includes pivoting the landing gear assembly relative to the cradle. Preferably the step of elevating the landing assembly towards the aircraft further comprises lifting the landing gear assembly. The second aspect of the invention, may—but need not—include a step of actually transporting the cradle and landing gear between facilities.

After the landing gear assembly is detached from the cradle, the cradle is preferably moved to the stowed position and removed from under the aircraft.

According to a third embodiment of the invention, a method of transporting a landing gear assembly for installation on an aircraft is provided. The method comprises the steps of attaching (for example in a first facility) a landing gear assembly to a cradle and transporting the cradle with the landing gear assembly stowed within the cradle (for example from the first facility towards a second, different, facility). The cradle is arranged to provide protection for the landing gear assembly during the step of transporting. The cradle is further arranged to elevate the landing gear assembly for installation on the aircraft.

The step of attaching the landing gear assembly to the cradle preferably comprises clamping a main strut of the landing gear assembly to the cradle. This may be via a set of arcuate jaw clamps.

Preferably the step of attaching the landing gear assembly to the cradle comprises providing a secondary attachment for use when the landing gear assembly is stowed within the cradle.

The third aspect of the invention, may—but need not—include a step of actually elevating the landing gear assembly for installation of the landing gear assembly on the aircraft.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft. For the purposes of the present specification the term commercial passenger aircraft also covers aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments and aspects of the present invention will now be described by way of example only with reference to the accompanying schematic drawings of which.

DETAILED DESCRIPTION

Figure 1:
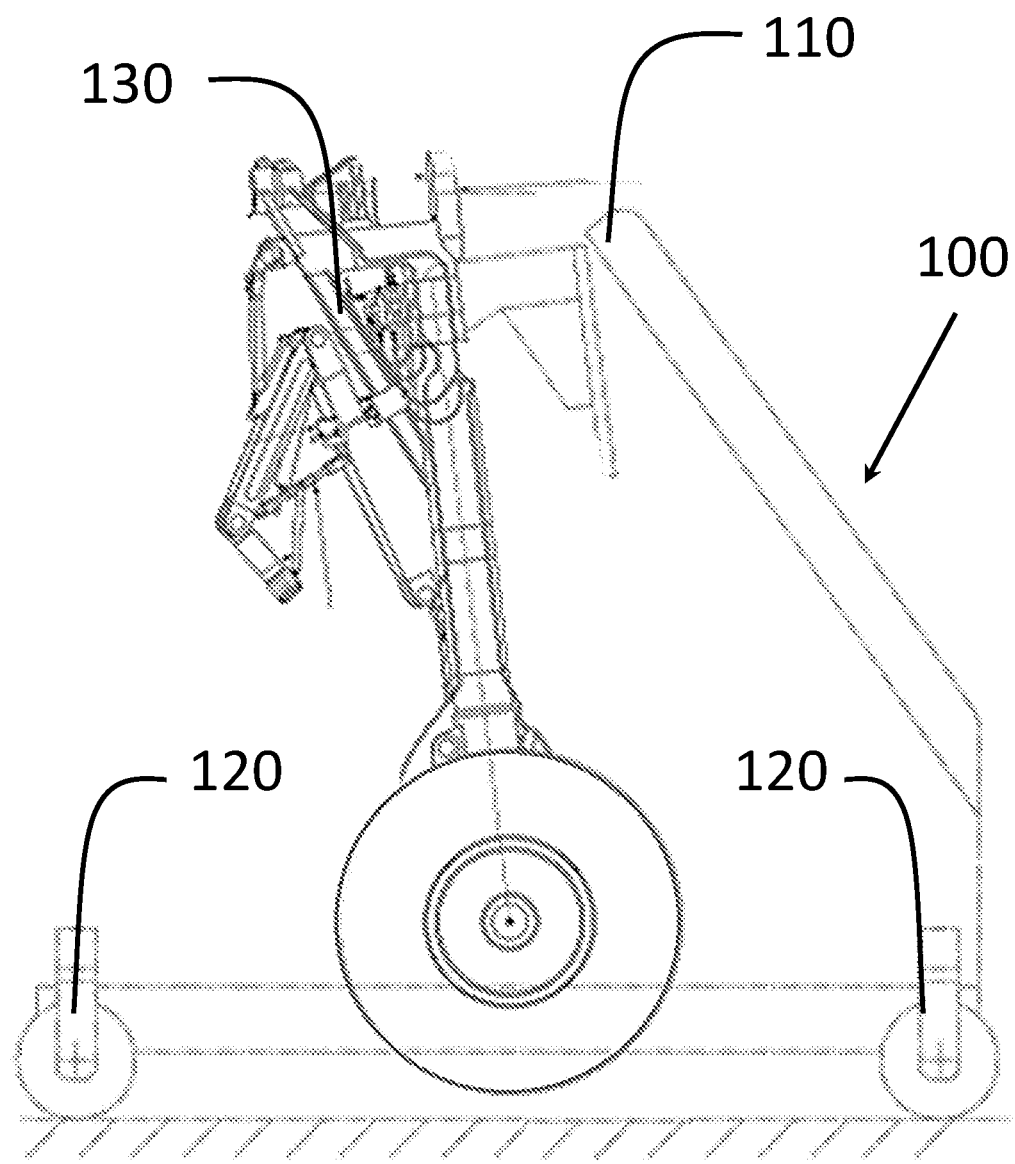
FIG. 1 shows a landing gear assembly attached to a stand.
Figure 2:
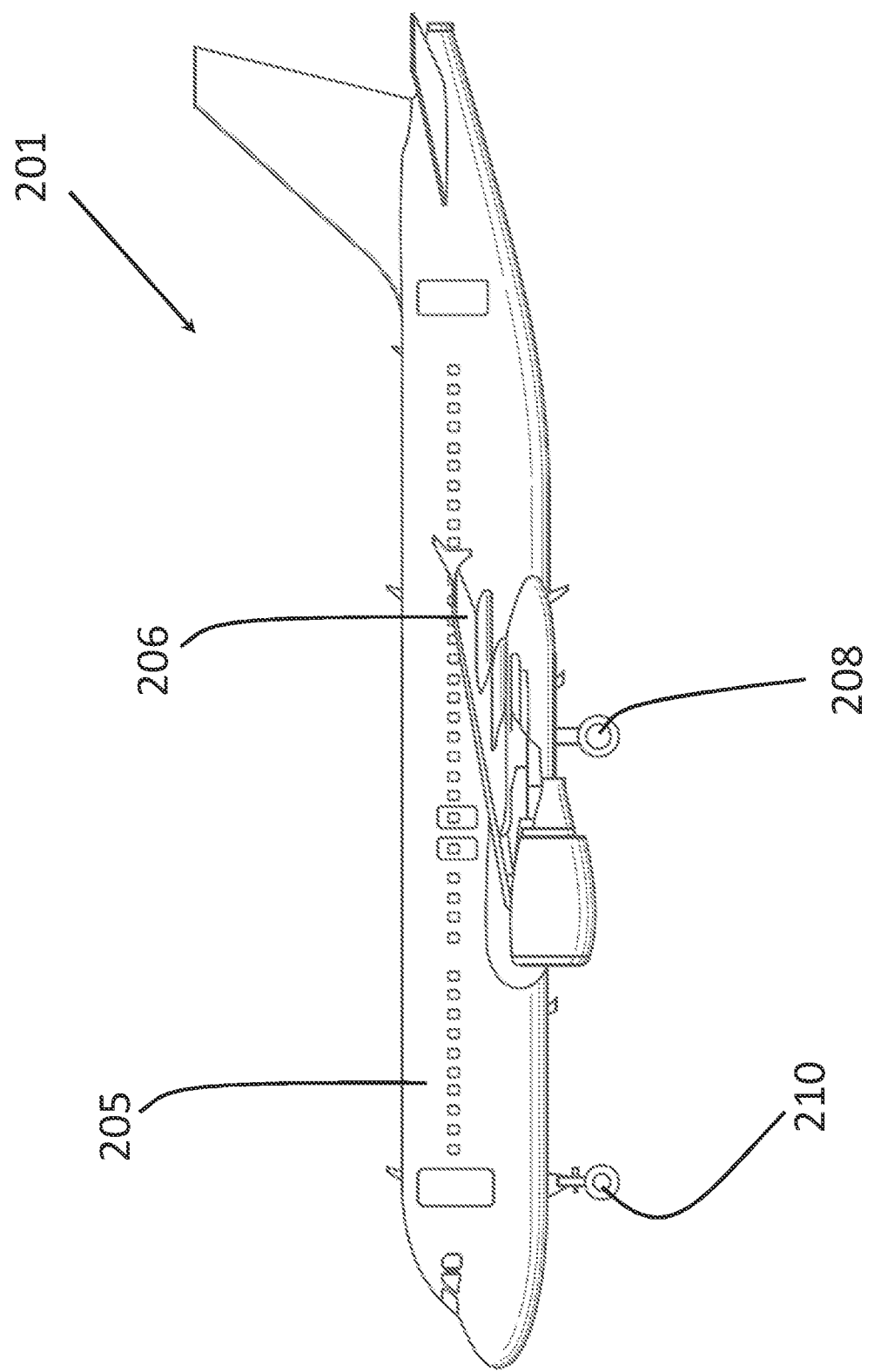
FIG. 2 shows an aircraft having landing gear assemblies installed according to embodiments of the invention.

FIG. 2 shows an aircraft 201 comprising a pair of wings 206 and a fuselage 205. The aircraft 201 is supported on the ground by sets of landing gear assemblies comprising main landing gear assemblies (MLG) 208 and a nose landing gear assembly (NLG) 210.

Figure 3:
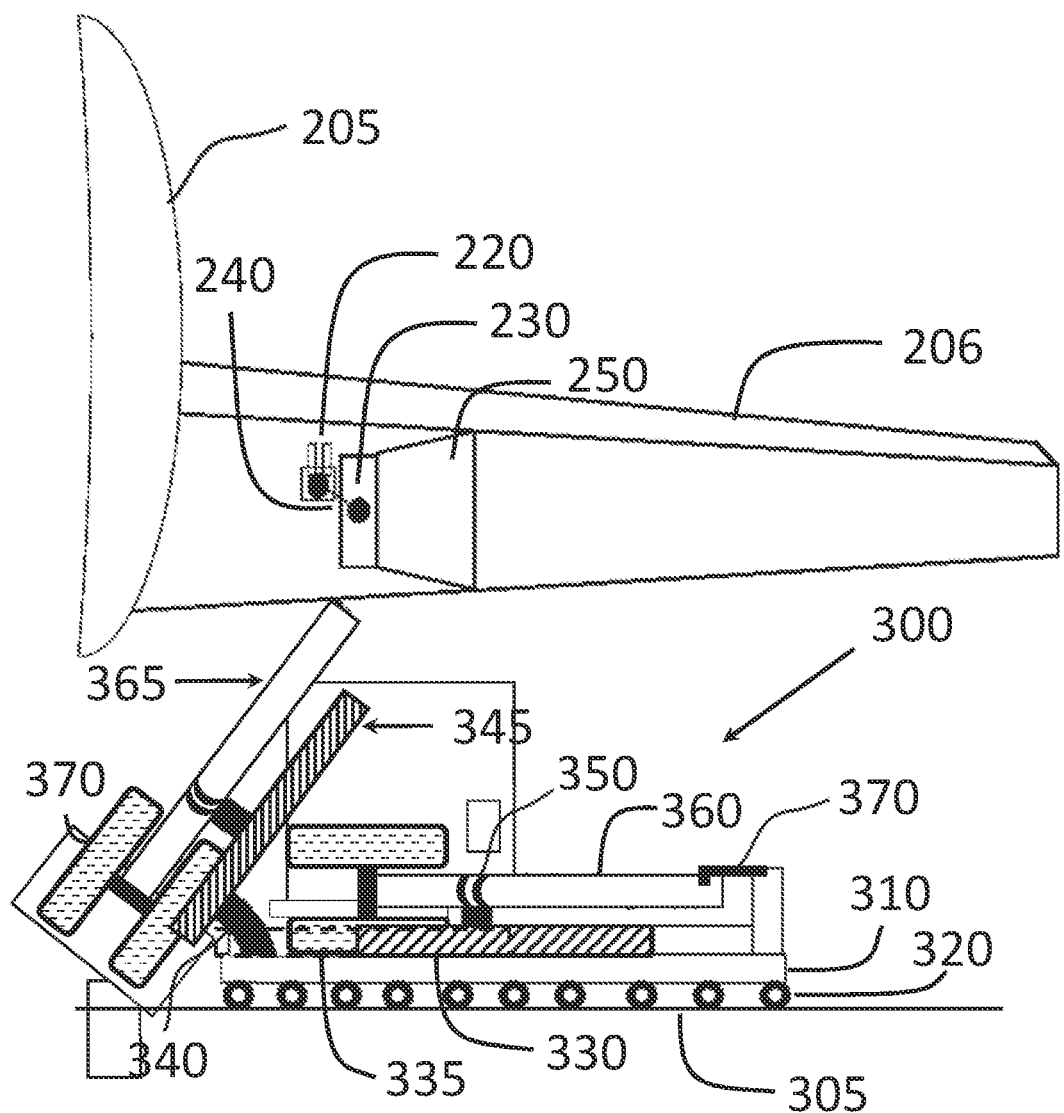
FIG. 3 shows a view of a cradle according to a first embodiment of the invention.

Referring now also to FIG. 3, a cradle 300 for supporting a landing gear assembly 360 is shown underneath one of the pair of wings 206 and fuselage 205 of the aircraft 201. A forward pintle mount 220 is attached to a rear spar (not shown) of the wing 206 and an aft pintle mount 230 is attached to a gear rib 250, which is cantilevered from the rear spar of the wing 206. The forward and aft pintle mounts 220 and 230 respectively comprise the main attachment point for the landing gear assembly 360, and together they provide an axis 240 about which the landing gear assembly 360, when attached, rotates via pintles to retract and extend.

The cradle 300 has a chassis 310, to which sets of wheels 320 are attached via axles and associated suspension and steering components (not shown). There may be two sets of wheels 320, or more than two. The sets of wheels 320 support the cradle 300 on the ground and facilitate horizontal movement along the ground when the cradle 300 is transported from one location to another, and when the cradle 300 is being positioned under the aircraft 201 at floor 305 of the Final Assembly Line (FAL). At least some of the wheels 320 may be fitted with motors, brakes, steering joints and/or suspension devices to facilitate controllable movement of the cradle 300 along the ground, facilitating controlled movement parallel to the ground with three degrees of freedom (translational movement parallel to the ground in two directions and rotation about a non-parallel axis).

Alternatively, the chassis 310 may be arranged to be mounted on a separate vehicle such as an autonomous ground vehicle (AGV), forming a separated part of the cradle, in which case the sets of wheels 320 may not be required. In such a case, the chassis may be considered as being readily detachable from the cradle's transportation equipment. The cradle will however be specifically arranged and configured (with releasable connection fittings for example) to be attached to such an AGV.

An arm 330 of the cradle is connected to the chassis by a hinged joint 340. In this way the arm 330 may rest on the chassis 310 in a stowed (substantially flat and horizontal, or near horizontal) position. It may also be rotated about the hinged joint 340 to an elevated position, such that a non-hinged end of the arm 330 is elevated with respect to the chassis 310, as shown by arrow 345.

The arm 330 has a set of arcuate jaw clamps 350, which are arranged to clamp the landing gear assembly 360 to the arm 330 in a manner to be further described below. An optional further fixing 370 may be provided between the chassis 310 and the landing gear assembly 360 in order to provide further security and support to the landing gear assembly 360 while the arm 330 is in the stowed position and the landing gear assembly 360 is stowed within the cradle 300. The further fixing 370 may, for example, be arranged to locate at pintle holes or pintle pins of the landing gear assembly 360. This may be particularly useful for securing and supporting the landing gear assembly 360 when the cradle 300 is being transported on a road or between buildings within an airport, and/or to or from a maintenance facility. Prior to the arm 330 being rotated from the horizontal position to the elevated position, this further fixing 370 would be disengaged.

It will be appreciated that during movement of the cradle 300 along the ground, with the arm 330 the stowed position and the landing gear assembly 360 stowed within the cradle 300, substantially no parts of the landing gear assembly 360 protrude from the contours of the chassis 310. In this way the landing gear assembly 360 is protected within the cradle 300, thus reducing the likelihood of damage to the landing gear assembly 360 during ground movement of the cradle 300.

The cradle 300 may be further arranged such that prior to movement between the stowed position and the elevated position, the arm 330 may move along a length of the chassis 310 by means of a carriage to which it is mounted (not shown). The carriage could move on rails, bearings or suitable sliding means, as shown by box 335, such that when in the stowed position the landing gear assembly 360 is entirely contained within the contours of the chassis 310, and prior to elevation the arm 330 may be displaced transversely with respect to the chassis 310 by the carriage to the position of box 335 such that wheels 370 or another portion of the landing gear assembly 360 protrude over the edge of the chassis 310. This further lowers the required clearance between the aircraft wing 206 and the floor 305 of the FAL, since the height of the chassis 310 does not need to be added to the clearance required of the landing gear assembly 360.

The amount of elevation of the arm 330 (and when attached, the landing gear assembly 360) depends on several factors including the geometry of the landing gear assembly 360 and the available manoeuvring space under the wing 206.

The hinged joint 340 may be arranged to rotate the arm 330 to any suitable angle up to and including a substantially perpendicular position (90 degrees with respect to the plane of the chassis 310). In particular the arm 330 may be raised to an angle of less than 90 degrees, such as 20, 30 or 45 degrees (approximately as shown by arrow 365), degrees or any suitable intermediate angle. In this way, the landing gear assembly 360 may be positioned by the arm 330 in an orientation corresponding to a partially retracted configuration. This has the benefit of reducing the height above ground that the aircraft 201 has to be raised in order to attach the landing gear assembly 360 to the forward and aft pintle mounts 220 and 230 respectively. Furthermore the angle of elevation may be chosen such that when the landing gear assembly 360 is aligned with the axis 240, optimal clearance is obtained with respect to other components of the wing 206 and the landing gear assembly 360, and good access is provided for maintenance personnel who are required to attach the landing gear assembly 360 to the forward and aft pintle mounts 220 and 230 respectively.

It will also be appreciated that when the arm 330 is rotated by the hinged joint 340 to the elevated position 345, the centre of mass of the cradle 300 with the landing gear assembly 360 attached may shift to a position near or outside of the leftmost edge of the chassis 310 (as viewed in FIG. 3). Therefore the chassis 310 may be provided with outriggers (not shown) in order to prevent the cradle 300 from being disturbed from a stable position on the floor 5 when the arm 330 is in the elevated position. Alternatively a counterweight may be incorporated within the chassis 310 instead of outriggers in order to achieve the same result. It will be appreciated that while the centre of mass of the landing gear assembly 360 may be higher when in the elevated position, there may be parts of the landing gear assembly 360 that are lower (for example part(s) of the wheel axles and/or wheels if fitted) in the elevated position as compared to the stowed position (as can be seen from FIG. 3).

Figure 4:
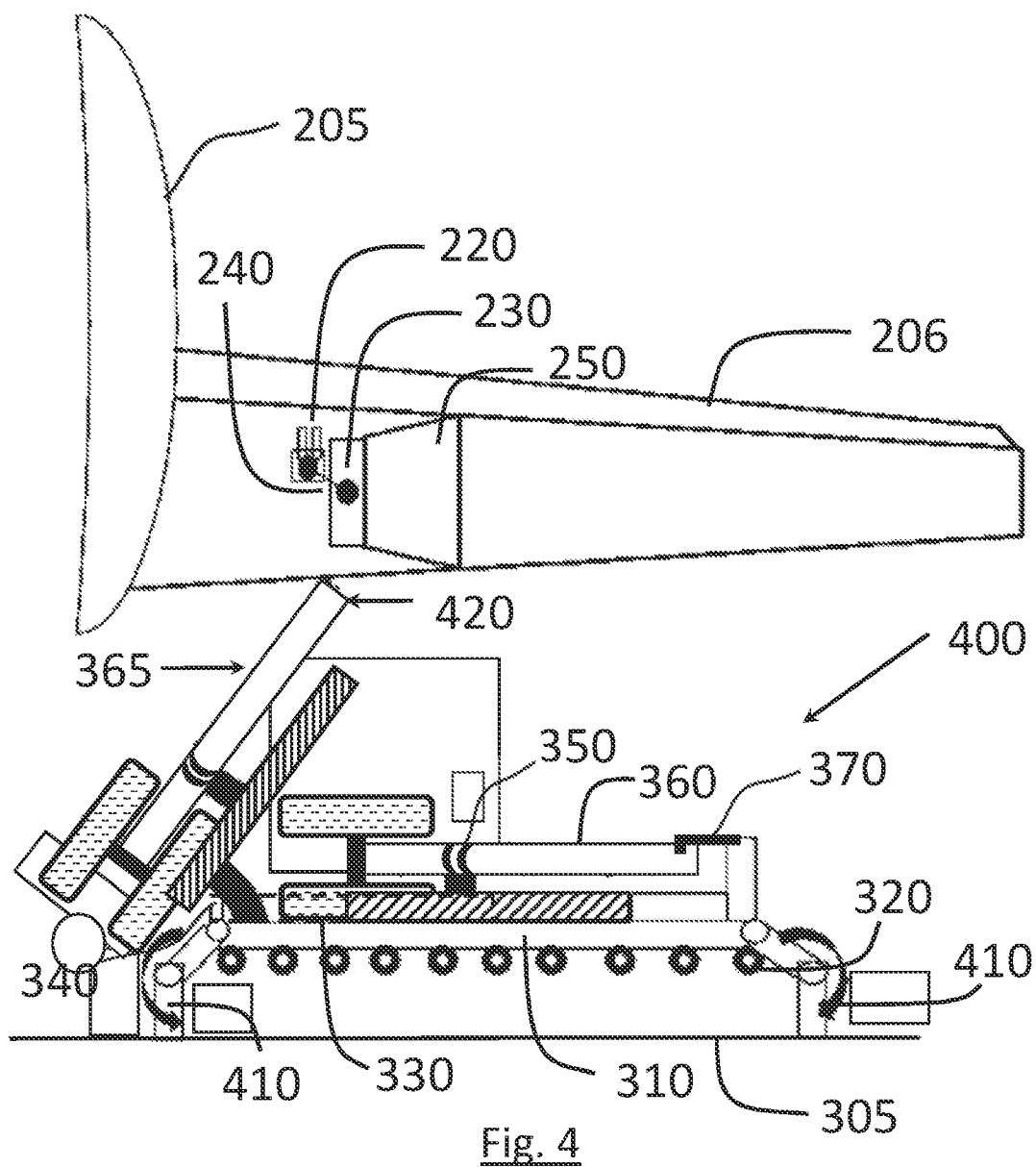
FIG. 4 shows a view of a cradle according to a second embodiment of the invention.

Referring now also to FIG. 4, there is shown an alternative embodiment of the cradle 300 of FIG. 3, now shown as cradle 400. The cradle 400 is similar to the cradle 300 of FIG. 3, but with the addition of lifting devices 410 attached to the chassis 310. Lifting devices 410 may be integral to the chassis 310, and deployed when the latter is in position under the aircraft wing 206, or they may be demountable, such that they are fitted to the chassis 310 when the latter is in position under the aircraft wing 206. The lifting devices 410 are arranged to lift the cradle 400 vertically, in order to move an upper portion of the landing gear assembly 360 (shown by arrow 420) towards the forward and aft pintle mounts 220 and 230 respectively for mounting the landing gear assembly 360 thereon. It will be appreciated that the lifting devices 410 may be so arranged as to also perform the function of the outriggers mentioned above, in order to stabilise the cradle 400 when the arm 330 is in the elevated position.

Figure 5:
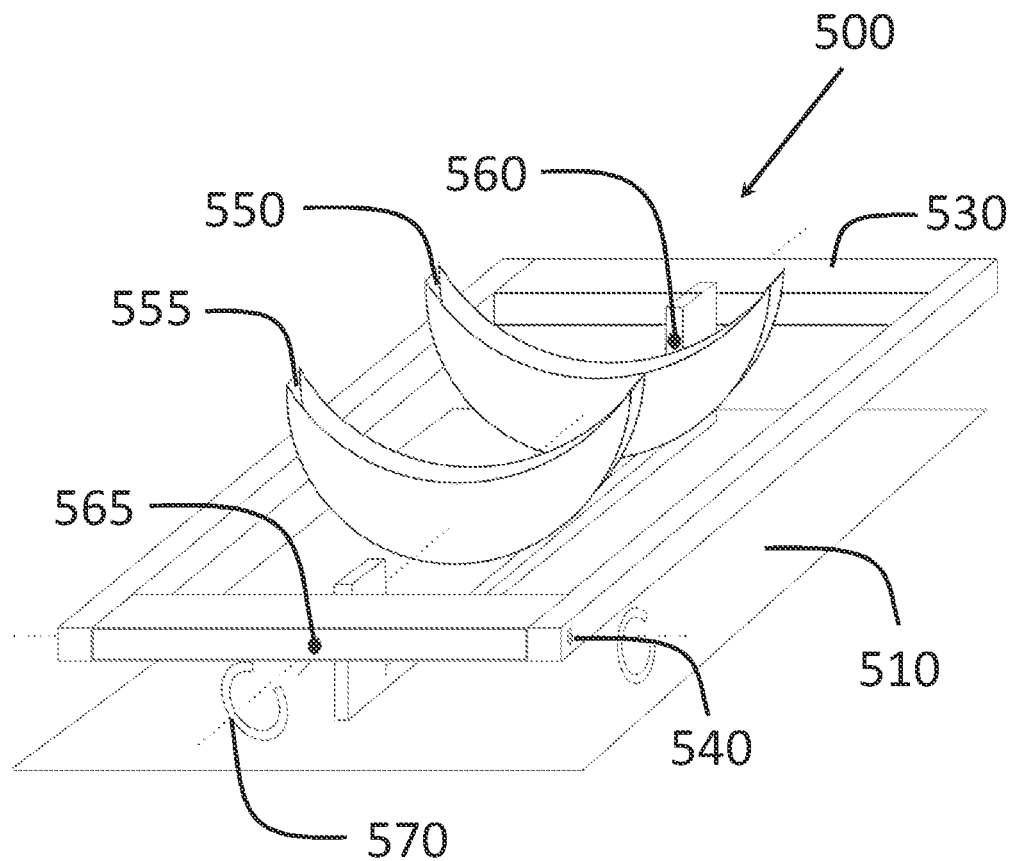
FIG. 5 shows a view of a cradle according to a third embodiment of the invention.

Referring now also to FIG. 5, a further embodiment of the invention is shown by cradle 500. Cradle 500 has a chassis 510 (corresponding to chassis 310) pivotally coupled to a frame 530 (corresponding to arm 330) via a hinged joint 540 (corresponding to hinged joint 340). The frame 530 includes first and second arcuate jaw clamps 550 and 555 respectively, (corresponding to the set of arcuate jaw clamps 350 of FIG. 3). The first and second arcuate jaw clamps 550 and 555 respectively are attached to the frame 530, and have jaws (not shown) which are arranged to selectively clamp a landing gear assembly (not shown) to the frame 530. The shape of each of the arcuate jaw clamps 550 and 555 respectively is defined by the shape of the corresponding part of the landing gear assembly to which each clamp will attach. For example the width and curvature of the jaws of each of the arcuate jaw clamps 550 and 555 respectively may be arranged to match the width and curvature of specific portions of a main gear leg of the landing gear assembly. The jaws clamp the landing gear leg/main strut by means of contact on opposite sides of the leg/main strut.

A further pair of pivot joints 560 and 565 are arranged to pivot the frame 530 about its longitudinal axis (marked 570), such that when attached, a landing gear assembly (not shown) may be rotated about the longitudinal axis 570. In this way with the frame 530 elevated via the hinged joint 540, the main attachment points of a landing gear assembly may be rotated such that they may be lined up with the forward and aft pintle mounts 220 and 230 respectively of the wing 206 of the aircraft 201. Therefore the frame 530 performs the same function as the arm 330 of the cradle 300, but with a further degree of freedom of movement.

It will be appreciated that other arrangements are possible which would give the frame 530 further relative movement with respect to the chassis 510 in other degrees of freedom beyond those described above. For example the frame 530 may be mounted to the chassis 510 via a turntable (not shown), such that the frame 530 can also rotate about a vertical axis (perpendicular to the plane of the chassis 310).

Alternatively the frame 530 and hinged joint 540 may be replaced by a robot arm arranged to move the landing gear assembly 360 in a similar manner to that described above (i.e. between stowed and elevated) in multiple degrees of freedom.

Figure 6:
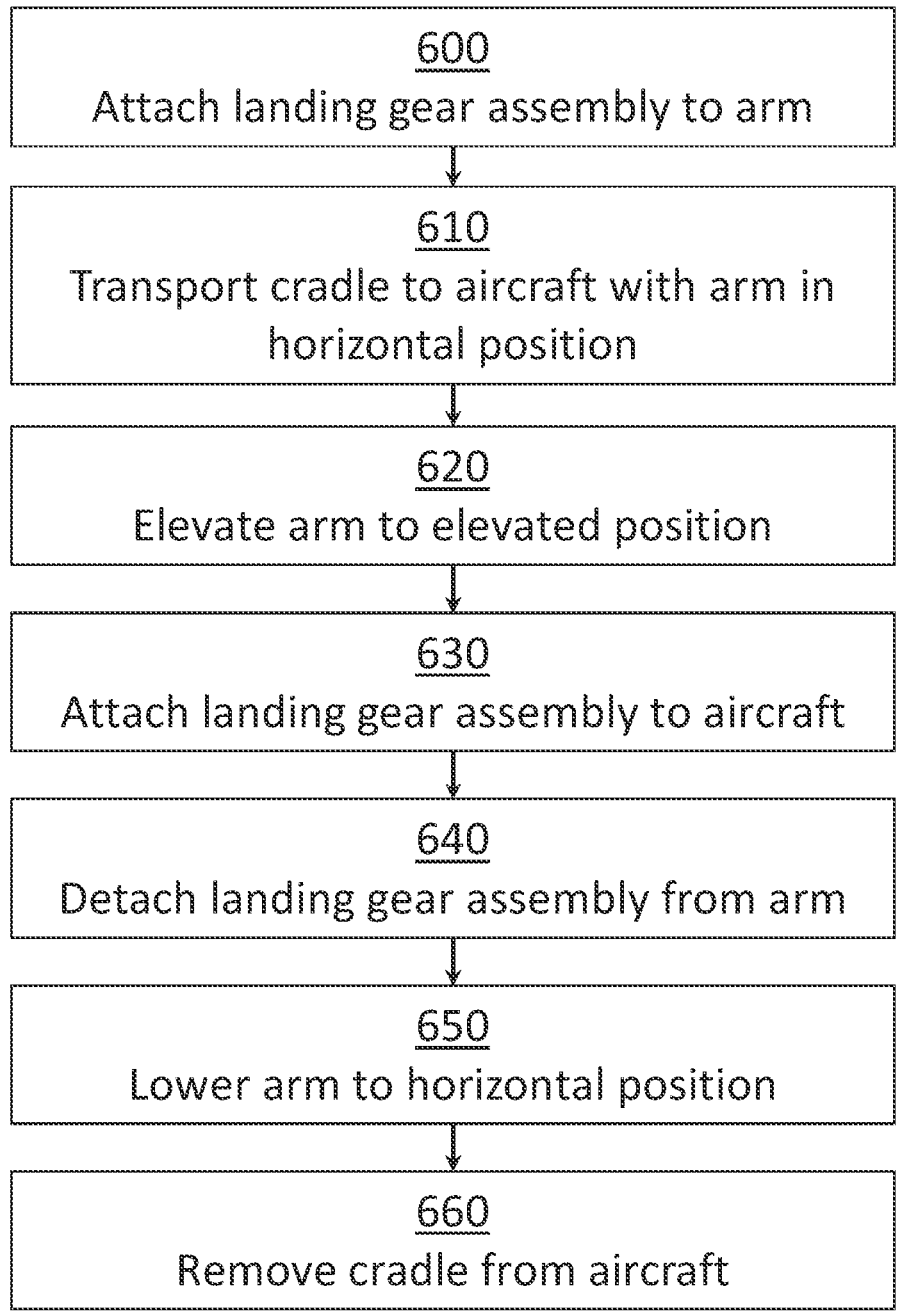
FIG. 6 is a flow diagram illustrating a method of transporting, positioning and fitting a landing gear assembly to an aircraft according to further embodiments of the invention.

In operation and referring now also to FIG. 6, in accordance with a further aspect of the invention a method of transporting, positioning and fitting a landing gear assembly to an aircraft will now be described. It will be appreciated that for the steps below, references to the cradle 300 of the first embodiment and its associated components may be substituted by references to either of the cradles 400 and 500 of the second and third embodiments respectively and their associated components.

At step 600, the landing gear assembly 360 is attached to the arm 330 of the cradle 300 via the arcuate jaw clamps 350 and, optionally, the further fixing 370 (the arm 330 being in the stowed position). This could be at a manufacturing facility of a landing gear assembly producer, or at a maintenance facility for servicing and overhauling of landing gear assemblies.

It will be appreciated that the cradle 300 provides protection for the landing gear assembly 360 especially when the arm 330 is in the stowed position. Further protection may be provided by barrier devices such as fences, covers, sidewalls or cages (not shown) which may be attached to the chassis 310 and/or the arm 330. These may be mounted in such a way that they do not foul the arm 330 or landing gear assembly 360 as the arm 330 rotates between the horizontal position and the elevated position, or they may demountable such that they are added after the landing gear assembly 360 is attached to the arm 330, and then removed prior to elevation of the arm 330 to the elevated position as described below.

At step 610, the cradle 300 with landing gear 360 attached is transported to the aircraft 201. It will be appreciated that the transportation to the aircraft 201 may be performed in various ways. The cradle 300 may be loaded on an AGV (not shown) as described above, or it could have its own means of propulsion, such as an electric motor attached to one or more of the sets of wheels 320. The cradle 300 could alternatively being towed as a trailer behind a tractor (not shown), or could be shipped via other means. Once at a facility where the aircraft 201 is being assembled or serviced, the cradle 300 may be stored at a storage area until needed, with the landing gear assembly 360 safely secured in the stowed position within the cradle 300.

When required the cradle 300 is manoeuvred into position under the wing 206 of the aircraft 201. It will also be appreciated that where the landing gear assembly 360 is to be mounted elsewhere on the aircraft, it would be manoeuvred into that position such as under the fuselage 205 or an engine nacelle. The cradle 300 may be guided into the required position via laser guidance, camera control, manually or by any suitable method.

Once in the correct position, at step 620, if fitted the optional further fixing 370 is removed, as are any of the aforementioned barrier devices. If the carriage arrangement described above is used, the arm 330 may be moved horizontally relative to the chassis 310 via the carriage arrangement. It is then rotated via the hinged joint 340 in order to elevate the arm 330 (with the landing gear assembly 360 attached) into the elevated position. Optionally, lifting devices 410 are also now engaged, to further raise the landing gear assembly 360 towards the forward and aft pintle mounts 220 and 230 respectively. Furthermore if the third embodiment is used, the pivot joints 560 and 565 of the cradle 500 described above may be used to rotate the frame 530 such that the elevated landing gear assembly 360 is correctly oriented with the forward and aft pintle mounts 220 and 230 respectively of the wing 206.

It will be appreciated that the movement of the arm 330 (or if applicable the frame 530 including the pivot joints 560 and 565) along with the carriage, the hinged joint 340 and the optional lifting devices 410 may be controlled with suitable remote control actuation means such as laser or optical guidance, in order to provide an accurate, efficient and controlled method for placing the landing gear assembly 360 in the correct position such that it is aligned for attachment to the forward and aft pintle mounts 220 and 230 respectively.

Once in position, at step 630 the landing gear assembly 360 is attached to the aircraft via the forward and aft pintle mounts 220 and 230 respectively. Further attachments of the landing gear assembly 360 to the wing 206 (such as a sidestay—not shown) may then also be made.

After attaching the landing gear assembly 360 to the wing 206, at step 640 the arcuate jaw clamps 350 are released and the landing gear assembly 360 is detached from the arm 330 and therefore freed from the cradle 300. After this, at step 650 the arm 330 is lowered back down to the stowed position, and if used, the lifting devices 410 are now lowered and stowed or removed from the cradle 300.

Finally, at step 660, with the arm 330 in the stowed position, the cradle 300 may be removed from the vicinity of the aircraft 201. The cradle 300 may be returned to the manufacturer or maintenance facility for reuse with another landing gear assembly, or it may be stored nearby if required to assist in the removal of a landing gear assembly from an aircraft, in which case the above steps could be repeated in reverse order.

With the cradle 300 removed from the vicinity of the aircraft, the landing gear assembly 360 may now be deployed to its fully extended (i.e. vertical) position if required.

It will be appreciated that via the above method steps, the landing gear assembly 360 is protected by the cradle 300 from the time it is attached to the arcuate jaw clamps 350 (or other interconnection devices) until it is attached to the aircraft 201 by the pintle pins. It will also be appreciated that the arcuate jaw clamps 350 are oriented and arranged such that once they have been released from the landing gear assembly 360 at step 640, they do not come into contact with the landing gear assembly 360 again during lowering of the arm 330 at step 650.

Furthermore no further manipulation of the landing gear assembly 360 "by hand" is required such as removing it from a packing stillage, mounting it on a stand or trolley, attaching hoist straps, hoisting it into position, and removing the hoist after installation. Furthermore the protected position of the landing gear assembly 360 entirely within the chassis 310, and the provision of optional protection fences, covers, sidewalls and/or cages minimises the likelihood of damage to the landing gear assembly 360 during transportation.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The lifting devices 410 are described above as being coupled to the chassis 310. However it is also possible to arrange the lifting devices 410 such that they lift the arm 330 with respect to the chassis 310. Alternatively rather than lifting devices 410, the arm 330 could include a telescopic extension arrangement such that once in the elevated position, the arcuate jaw clamps 350 are arranged to move with respect to the hinged joint 340, thus extending the landing gear assembly 360 in a generally upward direction towards the wing 206. It will also be appreciated that a simplified arrangement is possible whereby the arm 330 is only coupled to the chassis 310 via the hinged joint 340 and the cradle 300 has no further moving or lifting arrangements. Furthermore the hinged joint 340 could be arranged as a floating hinge, or replaced with another arrangement entirely such as a spherical joint or the robot arm described above.

Furthermore other clamping or interconnection arrangements may be used in place of the arcuate jaw clamps 350. For example such interconnection devices may include straps, and these could be adapted to secure the landing gear assembly 360 by an element other than the main leg strut described above. If straps are used, these may need to be placed in such a way that the landing gear assembly 360 does not slide through the straps when elevated by the hinged joint 340.

It will be appreciated that the method of the invention could be performed by different parties at different stages. The step of attaching the landing gear assembly to the arm of the cradle may be performed at a manufacturing facility of a landing gear assembly producer in a first country by a first party. Transportation of the cradle and the landing gear assembly to an aircraft may be conducted by a different party, and may involve transporting the cradle and the landing gear assembly to a different country (optionally passing through one or more other countries en route). Installing the landing gear assembly on an aircraft at a final assembly line may be carried out by a different party again.

Transportation of the cradle and the landing gear assembly between facilities may include transporting the cradle on a road between buildings. Transportation of the cradle and the landing gear assembly between facilities may include transporting the cradle out of one building and/or into another building. The buildings may be linked. The buildings may be separated by a distance of more than 100 m and may be many miles apart from each other.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A cradle for supporting a landing gear assembly to be installed on an aircraft, the cradle comprising;
   a chassis having a contour and configured to facilitate transportation of the cradle between a manufacturing facility and a FAL or maintenance facility;
   an arm coupled to the chassis, the arm being movable between a stowed position and an elevated position, the arm including at least one clamping device for securing the landing gear assembly to the arm;
   wherein the at least one clamping device further includes first and second arcuate jaw clamps configured to secure a main strut of the landing gear assembly to the arm;
   wherein the first and the second arcuate jaw clamps each includes a width and a curvature configured to match a width and a curvature of a specific portion of the main strut of the landing gear assembly;
   wherein the cradle is configured to protect the landing gear assembly when transported by the cradle between the facilities; and
   in use, the landing gear assembly is secured by the at least one clamping device such that
      (a) when the arm is in the stowed position, the landing gear assembly is stowed in the cradle for transportation, the landing gear assembly being protected by the cradle, and wherein no parts of the landing gear assembly protrude from the contours of the chassis, and
      (b) when the arm is in the elevated position, the landing gear assembly is elevated for installing the landing gear assembly on the aircraft.

2. The cradle of claim 1, wherein the arm is coupled to the chassis via a hinged joint such that the arm is arranged to rotate about the hinged joint between the stowed position and the elevated position.

3. The cradle of claim 1, wherein an included angle between the stowed position and the elevated position is between 30 and 60 degrees.

4. The cradle of claim 1, wherein the cradle further comprises a lifting device such that the arm is arranged to be to be lifted towards the aircraft by the lifting device.

5. The cradle of claim 1, wherein the arm further comprises a frame arranged to rotate about its longitudinal axis.

6. The cradle of claim 1, wherein the cradle further comprises at least one further fixing for attaching the landing gear assembly to the cradle when the arm is in the stowed position.

7. The cradle of claim 1, wherein the cradle further comprises at least one barrier arranged to protect the landing gear assembly when the arm is in the stowed position.

8. A method of supporting a landing gear assembly using the cradle of claim 1, comprising:
   receiving at a position under the aircraft, the landing gear assembly attached to a cradle, the landing gear assembly being stowed within the cradle suitable for transportation of the landing gear assembly between facilities with the cradle providing protection for the landing gear assembly during such transportation;
   after the step of receiving, elevating the landing gear assembly towards the aircraft;
   after the step of elevating, attaching the landing gear assembly to the aircraft; and
   after the step of attaching the landing gear assembly to the aircraft, detaching the landing gear assembly from the cradle.

9. The method of claim 8, wherein the step of elevating includes pivoting the landing gear assembly relative to the cradle.

10. The method of claim 8, wherein the step of elevating further comprises lifting the landing gear assembly.

11. The method of claim 8, wherein the step of elevating includes both pivoting the landing gear assembly relative to the cradle and lifting the landing gear assembly.

12. The method of claim 8, wherein the method further comprises, after detaching the landing gear assembly, removing the cradle from under the aircraft.

13. A method of transporting a landing gear assembly using the cradle of claim 1, comprising:
   in a facility, attaching the landing gear assembly to the cradle; and,
   after attaching the landing gear assembly to the cradle, transporting the cradle with the landing gear assembly stowed within the cradle from the facility towards a different facility, the cradle providing protection for the landing gear assembly during the transporting;
   wherein the cradle is further arranged to elevate the landing gear assembly for installation on the aircraft.

14. The method of claim 13, wherein the step of attaching the landing gear assembly to the cradle further comprises providing a secondary attachment for use when the landing gear assembly is stowed within the cradle.

15. The method of claim 14, wherein the secondary attachment includes a fixing which is arranged to locate with at least one of a pintle hole and a pintle pin of the landing gear assembly.

16. The method of claim 13, wherein the step of attaching the landing gear assembly to the cradle comprises clamping the main strut of the landing gear assembly to the cradle and additionally securing the landing gear assembly within the cradle with a secondary attachment.

17. The method of claim 16, wherein the secondary attachment includes a fixing which is arranged to locate with at least one of a pintle hole and a pintle pin of the landing gear assembly.

18. The method of claim 13, wherein the step of attaching the landing gear assembly to the cradle comprises clamping the main strut of the landing gear assembly to the cradle.

19. The method of claim 13, in combination with a step of using, at the different facility, the cradle to elevate the landing gear assembly for installation on the aircraft.

\* \* \* \* \*